UNITED STATES PATENT OFFICE.

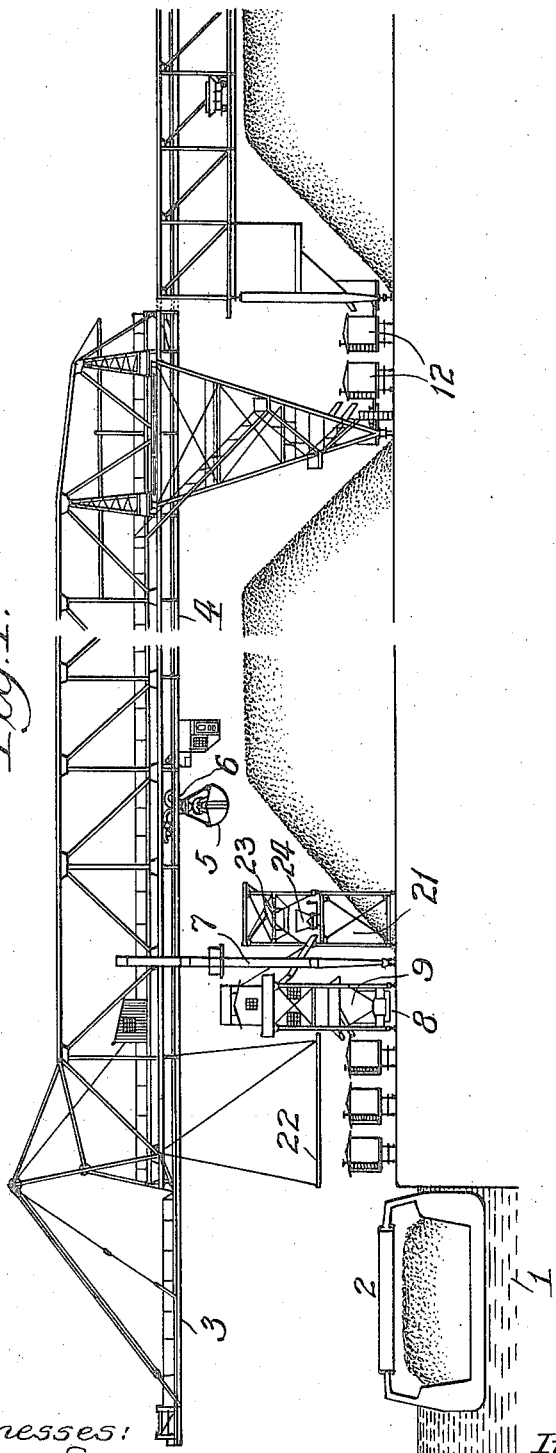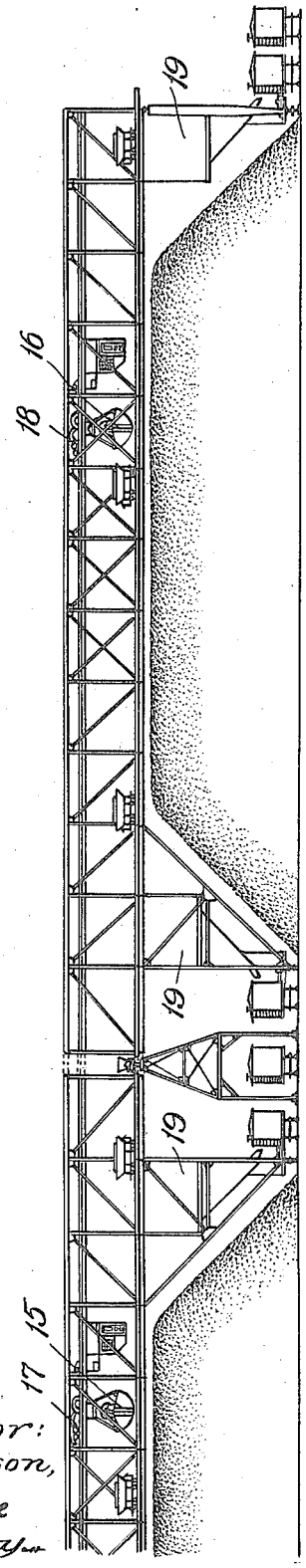

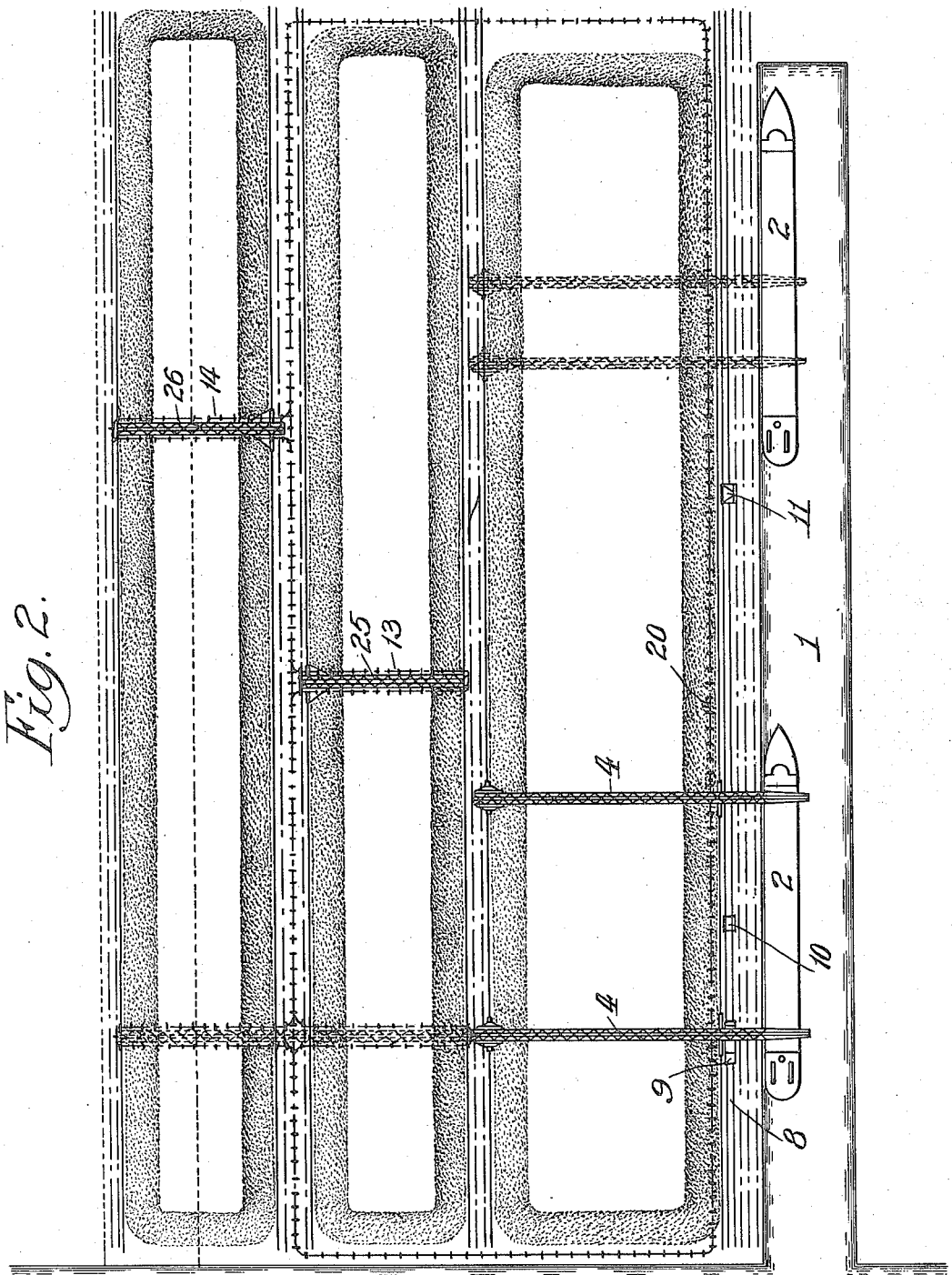

CHARLES S. WILLIAMSON, OF CHICAGO, ILLINOIS, ASSIGNOR OF ONE-HALF TO MEAD-MORRISON MANUFACTURING COMPANY, OF BOSTON, MASSACHUSETTS, A CORPORATION OF MAINE.

COAL-HANDLING MACHINERY.

1,162,838.  Specification of Letters Patent.  Patented Dec. 7, 1915.

Application filed June 24, 1912.   Serial No. 705,359.

*To all whom it may concern:*

Be it known that I, CHARLES S. WILLIAMSON, a citizen of the United States, residing at Chicago, in the county of Cook and State of Illinois, have invented new and useful Improvements in Coal-Handling Machinery, of which the following is a specification.

It is the object of the present invention to provide coal handling machinery suitable for use in unloading coal from boats and ultimately delivering the coal to a dock for storage or to cars for shipment.

More particularly the present invention aims to handle coal over a dockage of wide area, screening and sorting the coal when desired and delivering the valuable lump coal to its storage space with a minimum of breakage and degradation, the machinery being so arranged that the speed of unloading is rapid and is substantially the same whether the coal is delivered to the dockage close to the boat or is carried across to a remote portion of the storage area.

The objects above enumerated and others, which will hereinafter appear, may be accomplished by the embodiment illustrated in the accompanying drawings, and hereinafter described in detail, this embodiment employing, in conjunction with a traveling unloading bridge and its adjuncts, a cable-road or conveyer equipped with cars which pass with regularity under the unloading bridge and can receive loads of coal for distribution to other bridges of the plant where the coal can be discharged to the dock. This cable-road or its equivalent, in conjunction with the plurality of movable bridges, gives to the system a flexibility and speed and range of operation, heretofore unobtainable in coal handling plants, suitable for this work.

In the drawings, Figures 1 and 1ᴬ show in elevation the unloading bridge and its two-coöperating auxiliary bridges, together with some of the cable cars which follow one another at regular intervals along the cable-road. Fig. 2 is a plan view, largely diagrammatical, showing the lay-out of a plant constructed in accordance with the present invention.

In the construction shown in the drawings, the dock property lies at the side of the slip 1 so that boats 2 loaded with coal may be drawn up under the over-hanging apron 3 of an unloading bridge 4. This bridge is preferably movable along tracks paralleling the slip and is equipped with a grab bucket 5 and an electrically-operated man-trolley 6 movable along the bridge in usual manner. Immediately in front of the shear leg 7 of the bridge at the slip side of the dock is a service track 8 of wide gage, along which a portable screening plant 9 may be moved for the convenient screening and loading of coal picked up from the boat by the grab bucket. A car loader 10 and a portable "run of mine" hopper 11 may also be arranged for movement along the service track. Railway cars may be run in on suitable tracks between the screening plant and the slip. The rear or V-leg of the tower may be provided with a large hopper for storing "run of mine" coal to be delivered as desired into railway cars 12 switched in at the rear of the bridge.

As shown in Fig. 2 the unloading plant may comprise two unloading bridges of the same construction for unloading simultaneously at the two boat hatches.

In addition to the movable unloading bridges, the plant may comprise two auxiliary movable bridges marked respectively 13 and 14. Each of these bridges is movable along its own rails and they are provided respectively with grab buckets 15 and 16 operated from man-trolleys 17 and 18 and capable of delivering coal at either end from storage hoppers 19 into railway cars, box car loaders being used in conjunction with the hoppers when desired.

The three bridges can be brought into alinement as indicated in dotted lines on Fig. 2 and when thus arranged the man-trolley 6 and grab bucket 5 of the unloading bridges may be taken across from one bridge to the next and therefore can deliver directly to any part of the dock, a bucket of coal taken directly from the slip. Such a manipulation would deliver the coal to the dock with a minimum of handling and consequently with a small breakage loss, but would give a very slow speed of unloading because of the time consumed in moving the loaded bucket across the bridge structures to the point of discharge and then moving it back for the next load.

As a part of the present invention, a cableway is provided, whereby these long hauls are obviated and whereby the speed of unloading is as great or even greater when the coal is to be stored close to the slip. This cable road may be operated with a continuously moving cable or may be an electric line or other suitable transportation system, but should be equipped with cars of such size and construction that they may be readily loaded while passing under the unloading bridge and can be made to deliver their loads while passing over one or the other of the two auxiliary bridges. As an arrangement suitable for this purpose, I have shown in the drawings (Fig. 2) a cable-road 20 which runs along the slip side of the dock immediately back of the shear leg of the unloading bridge and which makes a loop over the dockage by passing between the adjacent ends of the auxiliary bridges 13 and 14. At the slip side of the dock this cable-way is carried on a suitable structure 21 positioned between the coal pile and the shear leg of the bridge, and preferably elevated not materially above the suspended canopy 22 used to protect the cars from falling coal. Above the cable-way is a loading hopper 23 movable along the cable-way so that it may be brought directly under the bridge. Into this hopper coal may be dropped from the grab bucket and out of the hopper a car load of coal will be dumped automatically or otherwise into each car as it passes along the cable-way under the hopper. The car is indicated somewhat diagrammatically in Fig. 1 at 24.

The elevated structure 21 on which the cable-road is laid is somewhat higher between the bridges 13 and 14, the approach to this higher level preferably being with an upgrade of about 5%. The bridges 13 and 14 are equipped with cable driven loops 25 and 26 so that loaded cars traveling along the return stretch of the main cable-way can be switched out over either of the bridges before dumping to the dock below.

Each car after it receives its load passes forward along the loop 20 and up the incline or grade until it reaches the level of the cable-road tracks on the movable bridges 13 and 14 as shown in Fig. 1ᴬ. Then by suitable switching arrangements the loaded cars can be diverted from the loop 20 to pass along either of the bridges 13 and 14, which readily dump their loads to the storage pile below and ultimately return to the main loop 20 and around again to the point of loading. The unloading may be at any point along either of the bridges 13 and 14 and inasmuch as those bridges are movable along the dockage, the wide range of discharge is insured.

The cars follow one another under the loading hopper at regular intervals and the cable-road can easily be made of large carrying capacity. Under these conditions the haul for the unloading grab bucket 5 and its man-trolley is very short, being only the distance from the boat to the loading hopper 23 and the unloading grab bucket can be operated at high speed and with maximum unloading efficiency, even though the coal is being delivered along the two rearmost storage piles of the dock.

Such coal as requires careful handling, either because of the size of the lumps or because of the use to which it is to be put, may be carried by the unloading bucket 5 out along the unloading bridge and disposed of in the first section of the dock storage or into the loading hopper of the V-leg of the bridge without the use of a cable-way and with only one handling of the coal.

If desired, one of the unloading bridges may be storing lump coal in the dock section next the slip, while the other one is loading the hopper of the cable road; or both bridges may be used to load hoppers of the cable road, thereby delivering all the coal to one or both of the storage sections remote from the slip.

It will be understood that the system here described, has great flexibility in its mode of operation and even when set up on docks of unusually large area, can be relied on to transport coal to remote parts of the docks with the same or even greater speed than to storage area near the slip, while at the same time, the system is complete as a means for transporting fragile or more valuable lump coal without undue breakage to the dock area covered by the unloading towers, or, by sending the loads across to the other bridges, even to remote parts of the dockage.

What I claim as new and desire to secure by Letters Patent of the United States is:—

1. In combination, a coal handling bridge movable on tracks along the dockage and having one of its ends arranged for projection over a boat to be unloaded, a man-trolley and grab bucket movable along said bridge and operative to lift and transport coal from said boat to any point below the bridge, one or more auxiliary bridges also movable along said dockage and capable of operative arrangement in alinement with the unloading bridge so that the unloading trolley can be sent across to the rear side of the dockage when desired, a loading hopper under the water end of said unloading bridge, a cable-way having cars movable under said hopper, said cable-way being arranged to transport said cars to said auxiliary traveling bridges, and means on said auxiliary bridges for transporting the cars back to the cable-way.

2. In combination a coal handling bridge movable on tracks along a dockage and having one of its ends arranged for projection over a boat to be unloaded, a man-trolley and grab bucket movable along said bridge and operative to lift and transport coal from said boat to the dock below the bridge, one or more auxiliary bridges also movable along said dockage and capable of operative arrangement in alinement with the unloading bridge so that the unloading trolley can be sent across to the rear side of the dockage when desired, a cable-way forming a loop on each of said auxiliary bridges, a loading hopper under the water end of said unloading bridge, and a cable-way passing under said hopper and having cars for receiving coal delivered to said hopper by the unloading bucket, said cable-way being arranged to transport said cars up an incline to the level of the cable-ways on said auxiliary bridges, whereby said loaded cars may be diverted across either of said auxiliary bridges to deliver its load to the rear parts of the dockage, as desired.

In witness whereof, I hereunto subscribe my name to this specification in the presence of two witnesses.

CHARLES S. WILLIAMSON.

Witnesses:
 C. C. BROOKS,
 G. ALYEA.